United States Patent [19]

Fox et al.

[11] 4,029,167

[45] June 14, 1977

[54] EXHAUST SYSTEM

[75] Inventors: Anthony E. Fox, Ann Arbor; Marcello Bargellini, Westland, both of Mich.

[73] Assignee: Massey-Ferguson Inc., Detroit, Mich.

[22] Filed: Apr. 11, 1975

[21] Appl. No.: 567,209

[52] U.S. Cl. .............................. 180/64 A; 280/756
[51] Int. Cl.² ....................................... B60K 13/04
[58] Field of Search ............. 180/64 A, 64 R, 54 A; 280/756

[56] References Cited

UNITED STATES PATENTS

| 1,856,005 | 4/1932 | Tomshow | 180/64 A X |
|---|---|---|---|
| 2,242,494 | 5/1940 | Wolf | 180/54 A |
| 3,942,600 | 3/1976 | DePriester et al. | 180/64 A |
| 3,963,087 | 6/1976 | Grosseau | 180/64 A |

FOREIGN PATENTS OR APPLICATIONS

| 750,710 | 12/1943 | Germany | 180/64 A |
|---|---|---|---|
| 743,439 | 6/1956 | United Kingdom | 180/64 A |

*Primary Examiner*—Joseph F. Peters, Jr.
*Assistant Examiner*—Milton L. Smith
*Attorney, Agent, or Firm*—Thomas P. Lewandowski

[57] ABSTRACT

An exhaust system for off the road vehicles of the type incorporating a roll-over protection structure for protecting the operator's station on the vehicle in which the exhaust system is incorporated within a housing forming a part of the protection structure.

9 Claims, 4 Drawing Figures

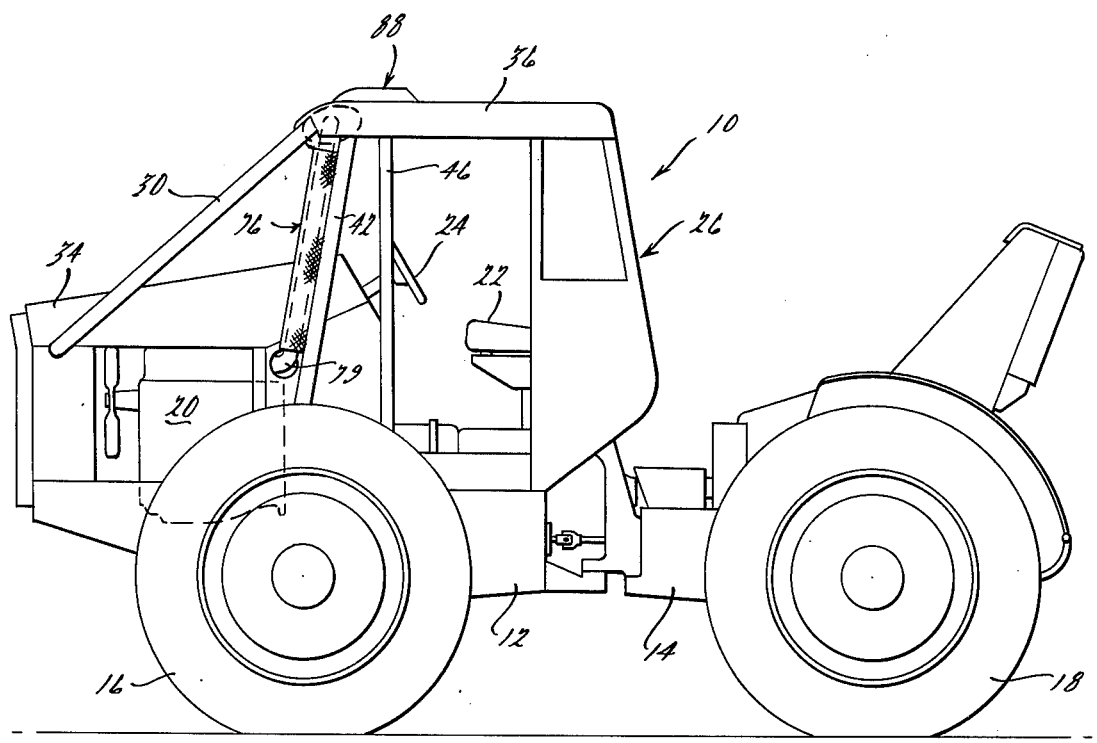
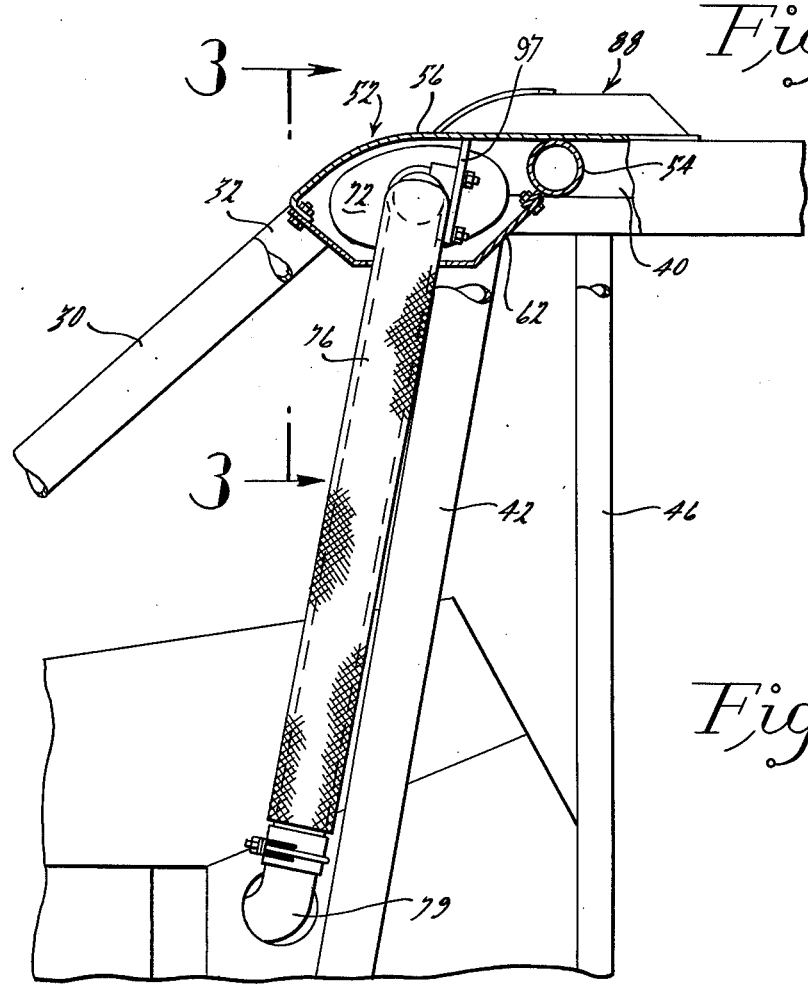

EXHAUST SYSTEM

This invention relates to vehicles and more particularly to an exhaust system for vehicles of the type used in off the road, logging operations.

Off the road vehicles such as those used in logging operations are operated under adverse conditions over rough terrain and in thickly wooded areas to skid logs from one location to another. Such vehicles, known as skidders, must be extremely durable to absorb the abuse of the terrain and encounters with overhanging branches. As a result, it has been the practice to provide an exhaust system for such vehicles in which the muffler is located at the top of the cab, over the head of the operator in a position where it will not encounter ground obstructions and be damaged. Moreover, the mufflers are normally encased in a protective housing such as a tank or box made of heavy plate metallic material to absorb engagement with low hanging branches and the like. Such protective housings however, increase the overall height of the vehicle and are generally unsightly.

It is an object of the invention to provide an exhaust system for off the road vehicles in which a portion of the exhaust system is incorporated in a safety canopy or roll-over protection structure for protecting the operator's station.

It is another object of the invention to provide an exhaust system for an off the road vehicle having a roll-over protecting structure which protects the operator in the event the vehicle is overturned and in which the exhaust system is incorporated in and protected by the roll-over protection structure.

An exhaust system for vehicles is provided in which a roll-over protection structure or canopy for the operator's station is formed in part by a housing which is disposed above the operator's station to protect the latter. The housing supports a muffler which receives exhaust gases through an exhaust stack from the vehicle engine, the muffler being protected from damage by the housing and delivering exhaust gases through a tailpipe passing through the roof of the protection structure. The tailpipe is further protected by a deflector which not only deflects exhaust gases upwardly and rearwardly of the operator's station but also protects the tailpipe from damage and encounter with obstructions. The housing is open at its opposite ends to maintain a circulation of air to dissipate the heat of the muffler and to shield the operator's station from heat radiating from the muffler.

FIG. 1 is a side elevation of a mobile vehicle incorporating the exhaust system embodying the invention;

FIG. 2 is a view at an enlarged scale of a portion of the structure shown in FIG. 1 with parts in cross section and broken away for clarity;

Figure 3:
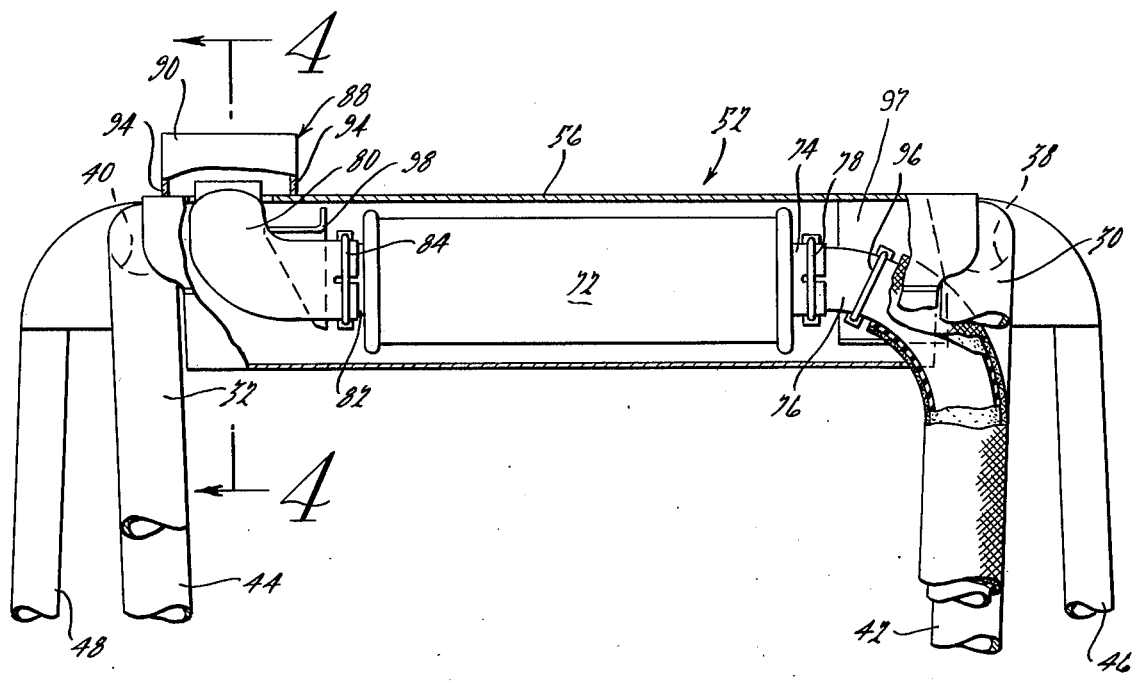
FIG. 3 is a sectional view taken on line 3—3 in FIG. 2.

Referring to the drawings, and particularly FIG. 1, the exhaust system embodying the invention is incorporated in an off the road vehicle such as a log skidder indicated at 10. Such vehicles are used in logging operations for towing logs which are skidded on the ground.

The vehicle 10 includes an articulated frame which is made up of a forward frame portion 12 and a rearward frame portion 14. The forward frame portion 12 supports front wheels 16 and the rearward frame portion 14 supports rear wheels 18. All of the wheels 16 and 18 are driven from a power plant 20 supported on the forward frame portion 12. The front wheels 16 and the rear wheels 18 are articulated relative to each other through means of the articulated frame portions 12 and 14 about a central longitudinal axis of the vehicle.

The vehicle 10 includes an operator's station having a seat 22 and controls including a steering wheel 24 supported by the forward frame portion 12.

The operator's station is protected by a safety canopy or cab 26. The cab 26 incorporates what is known as a roll-over protection structure in the form of a strong, rigid arrangement of tubular members which serves to protect the operator in his station in the event the vehicle should roll over or encounter low hanging branches or the like. The roll-over protection structure includes a pair of tubular members 30 and 32 which have their forward ends connected to opposite sides and at the forward end of the front frame 12 and extend upwardly and rearwardly of the vehicle to a roof portion 36 of the cab and then extend rearwardly and horizontally to form side members 38 and 40 of the roof portion 36 as best seen in FIG. 3.

The roof side frame members 38 and 40 are supported in an elevated position relative to the forward frame 12 by a pair of tubular supports 42 and 44, the lower ends of which are connected in any conventional manner to opposite sides of the vehicle frame 12 and the upper ends of which are welded, respectively, to the horizontal side frame members 38 and 40. Similarly, a pair of intermediate vertical members 46 and 48 have their lower ends connected to opposite sides of the forward vehicle frame 12. Vertical tubular members 46 and 48 extend upwardly and at a slight angle rearwardly and outboard of the tubular members 42 and 44. The upper ends of the vertical members 46 and 48 are attached to the roof portion 36. The transverse spacing of the members 46 and 48 is slightly greater than the spacing of tubular members 42 and 44 to form a brush guard or sweep.

The roof side members 38 and 40 together with their attached vertical support members, are held in spaced apart relationship at opposite sides of the vehicle by a transversely extending housing structure 52. The housing structure 52 includes a tubular cross member 54 which is disposed between the side members 38 and 40 and has its opposite ends welded thereto.

Figure 4:
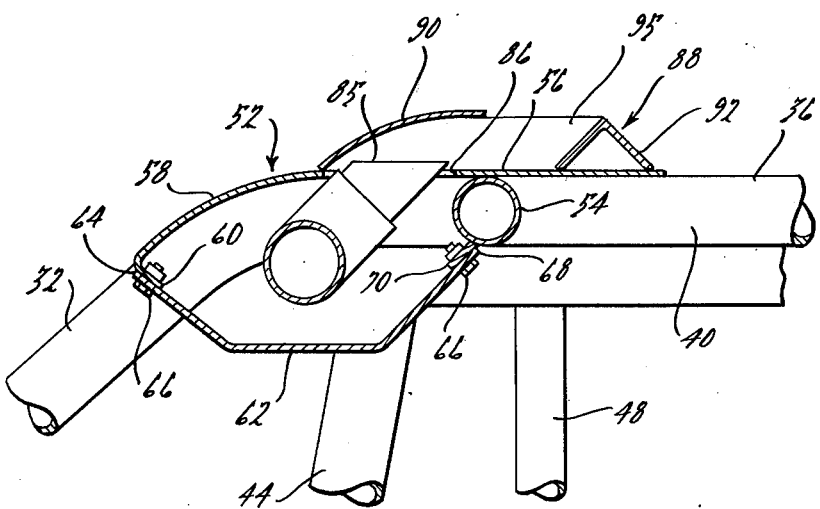
FIG. 4 is a sectional view taken on line 4—4 in FIG. 3.

A roof plate member 56 is disposed on top of the tubular cross member 54 and on top of the side members 38 and 40 and is welded thereto. As seen in FIG. 4, a forward portion 58 of the roof member 56 extends forwardly and downwardly to correspond to the curvature of the front tubular support members 30 and 32 and the roof side members 38 and 40. The leading edge of the forward portion 58 is formed with a flange 60 which extends transversely of the vehicle between the support member 30 and 32. A transversely extending trough member 62 is disposed below the roof plate member 56 and has a forward edge portion 64 fastened to the flange 60 by means of bolts 66. Similarly, the rearward transverse edge 68 of the trough member 62 is connected by means of bolts 66 to a bracket 70 welded to the lower side of the tubular cross member 54. The roof plate 56, trough 62 and tube 54 define a generally tubular chamber which is open at its opposite ends.

The various tubular members, 30, 32, 38, 40, 42, 44, 46, 48 and the housing structure 52 form a rigid protective structure for the operator's station and the forward angular tubes 30 and 32 act to deflect low hanging branches and the like upwardly and over the roof portion 36.

Disposed within the housing structure 52 is a muffler 72 which has a flange 74 at its inlet end connected to an exhaust duct or stack 76 by means of a flange clamp 78. The exhaust duct 76 passes through one of the open ends of the housing and a lower end portion 79 of the stack 76 extends downwardly and is connected in the usual manner to the exhaust manifold of the engine 20.

Referring now to FIG. 3, the muffler 72 extends transversely of the vehicle and within the housing structure 52 and has an elbow forming an exhaust or tail pipe 80 connected to a flange 82 at the exhaust end of the muffler 72 by means of a conventional clamp 84.

The exhaust pipe 80 forms a outlet end 85 which is disposed in an opening 86 in the roof plate 56 and is covered by a deflector structure 88 which serves to receive exhaust fumes and to deflect them generally upwardly and rearwardly of the vehicle. The deflector 88 includes a forward curved shield 90 as seen in FIG. 4 and a rearward wall formed by a transversely extending angle iron member 92 welded to a rearward extension of the plate 56. As seen in FIG. 3, the deflection shield 90 and member 92 are joined together at opposite sides by side walls 94. The plate member 90 and angle member 92 are spaced apart to form an opening 95 which permits the escape of exhaust fumes upwardly and rearwardly of the operator. The forward plate member 90 protects the open end of the exhaust pipe and serves to deflect branches and the like and prevents material as well as rain and snow from dropping vertically into the open end 85 of the exhaust pipe 80.

The muffler 72 is supported within the housing structure 52 by means of a U-bolt 96 in engagement with the upper end of the exhaust stack and passing through openings in a plate member 97 welded to the roof plate. The opposite end of the muffler 72 is supported by a bracket 98 mounted on the roof plate 56. The muffler 72 is disposed in spaced relationship to the plate member 56 and trough 62 which form a tube like housing open at its opposite ends to permit the circulation of air therethrough and prevent over heating of the muffler.

The exhaust stack 76 is provided with an insulating heat shield 99 such as asbestos and screen to prevent excessive heat from being transmitted to the operator. The trough member 62 acts also to protect the operator from radiation of excessive heat from the muffler.

An exhaust system for a mobile vehicle has been provided in which the mobile vehicle incorporates a protection canopy or roll-over protection structure for the operator's station and in which the exhaust system is incorporated in the roll-over protection structure. The roll-over protection structure has a roof portion disposed above the operator's station of the vehicle and the roof portion forms part of a housing within which a muffler is mounted for protection from damage by low hanging branches and the like. The muffler is disposed below the roof level and within the confines of the protection structure. The housing forming part of the protection structure permits the circulation of air and the dissipation of heat from the muffler while at the same time protecting the operator's station from heat radiating from the muffler. Exhaust gases from the muffler are discharged through the roof of the protection structure and through a deflector assembly which protects the discharge end of the exhaust system from encounter with obstructions and also serves to deflect and discharge exhaust gases upwardly and rearwardly relative to the operator's station.

The embodiments of the invention in which an exclusive property or privilege is claimed and defined as follows:

1. An exhaust system for a mobile vehicle having a wheel supported main frame and an operator station, the combination of; a protective frame structure for said operator station including longitudinally extending side frame members supported in elevated position relative to said main frame above said operator station, an elongated housing extending transversely between and to the front of said side frame members and being rigidly connected thereto, a muffler disposed in said housing, an exhaust duct connected to one end of said muffler and extending along one side of the frame structure to connect to the engine of said vehicle, and outlet pipe means connected to the other end of said muffler and forming an exhaust outlet at one end of said housing.

2. The combination of claim 1 in which said protective frame structure forms a roof portion above said operator's station and in which said muffler is disposed below said roof portion.

3. The combination of claim 1 in which said housing has open portions at opposite ends thereof, and in which said exhaust duct passes through one of said open portions.

4. The combination of claim 1 in which said muffler extends longitudinally of said housing in spaced relationship to the internal walls of said housing.

5. The combination of claim 1 in which said side frame members are supported by vertical frame members spaced at opposite sides of said main frame and extending between the latter and said side frame members and in which said housing is disposed between said vertical members.

6. The combination of claim 5 in which said exhaust duct is disposed within the spacing of said vertical members.

7. The combination of claim 1 in which said housing forms a roof portion, said roof portion forming a roof opening above and between said side frame members and in which said outlet pipe means forms an outlet opening communicating with said roof opening.

8. The combination of claim 7 and further comprising a deflector assembly mounted on said roof portion and forming a cavity communicating with said roof opening, said deflector assembly forming an exit passage for exhaust gases rearwardly of said roof opening.

9. The combination of claim 1 in which said exhaust pipe is covered with a heat shield.

* * * * *